US012783221B2

(12) United States Patent
Mincey

(10) Patent No.: US 12,783,221 B2
(45) Date of Patent: Nov. 3, 2026

(54) PLATFORM INTEGRATION SYSTEMS AND METHODS

(71) Applicant: COREONYX International, Inc., Leesburg, VA (US)

(72) Inventor: Guy E. Mincey, Leesburg, VA (US)

(73) Assignee: COREONYX International, Inc., Leesburg, VA (US)

( * ) Notice: Subject to any disclaimer, the term of this patent is extended or adjusted under 35 U.S.C. 154(b) by 242 days.

(21) Appl. No.: 18/926,703

(22) Filed: Oct. 25, 2024

(65) Prior Publication Data

US 2025/0138798 A1 May 1, 2025

Related U.S. Application Data

(60) Provisional application No. 63/593,388, filed on Oct. 26, 2023.

(51) Int. Cl.
*G06F 11/362* (2025.01)
*G06F 8/60* (2018.01)
(Continued)

(52) U.S. Cl.
CPC .............. *G06F 8/60* (2013.01); *G06F 21/577* (2013.01)

(58) Field of Classification Search
CPC ...... G06F 8/60; G06F 21/577; G06F 11/3684; G06F 11/3688; G06F 11/3692;
(Continued)

(56) References Cited

U.S. PATENT DOCUMENTS 10,303,586 B1 * 5/2019 Falko .................... G06F 11/323
11,809,907 B2 11/2023 Poort et al.
(Continued)

OTHER PUBLICATIONS

Wind River Software White Paper, Accelerate DevOps with Continuous Integration and Simulation, 10 pages (Year: 2022).*
(Continued)

*Primary Examiner* — Thuy Dao
(74) *Attorney, Agent, or Firm* — Pillsbury Winthrop Shaw Pittman LLP

(57) ABSTRACT

Techniques for application deployment that include: determining an integrated platform application definition for an integrated platform application; determining an integrated platform application programming interface (API) for the integrated platform application; selecting a set of platform application modules to be integrated into the integrated platform application; generating, based on the application modules selected and the platform API, the integrated platform application, the integrated platform application operable to: obtain, for each of two or more platform applications corresponding to a platform application of the set of platform application modules selected, application results data for the user generated by the platform application; consolidate the application results data obtained to generate a consolidated results report for the user; and present, via a platform user device associated with the user, the consolidated results report for the user; deploying, in response to determining that the integrated platform application test results satisfy threshold testing criteria, the integrated platform application.

20 Claims, 4 Drawing Sheets

(51) Int. Cl.

| | |
|---|---|
| ***G06F 8/77*** | (2018.01) |
| ***G06F 9/44*** | (2018.01) |
| ***G06F 9/54*** | (2006.01) |
| ***G06F 11/00*** | (2006.01) |
| ***G06F 11/30*** | (2006.01) |
| ***G06F 11/3668*** | (2025.01) |
| ***G06F 21/57*** | (2013.01) |

(58) Field of Classification Search

CPC ........ G06F 11/3698; G06F 8/447; G06F 8/10; G06F 8/30; G06F 8/34; G06F 8/35; G06F 8/41; G06F 8/63; G06F 8/73; G06F 8/75; G06F 8/76; G06F 9/45558; H04L 41/0266; H04L 41/0803; H04L 43/50

See application file for complete search history.

(56) References Cited

U.S. PATENT DOCUMENTS

| | | | | |
|---|---|---|---|---|
| 12,693,958 | B2 * | 7/2026 | Jansa .................. | G06F 11/3604 |
| 2014/0337711 | A1 | 11/2014 | Poole | |
| 2020/0320582 | A1 | 10/2020 | Hollis | |
| 2021/0263945 | A1 | 8/2021 | Siebel et al. | |
| 2023/0388143 | A1 | 11/2023 | Ansari et al. | |

OTHER PUBLICATIONS

CERTAIN-T™—COREONYX, Delivering Government Excellence in Digital Transformation, retrieved Aug. 21, 2024, pp. 1-9.

Notice of Allowance for U.S. Appl. No. 18/811,381 dated May 4, 2026, pp. 1-27.

* cited by examiner

PLATFORM INTEGRATION SYSTEMS AND METHODS

RELATED APPLICATIONS

This application claims benefit of and priority to U.S. Provisional Patent Application No. 63/593,388 filed Oct. 26, 2023 and titled "ARTIFICIAL INTELLIGENCE INTEGRATION MANAGEMENT SYSTEM AND METHOD," the entirety of which is hereby incorporated by reference.

FIELD

Embodiments relate generally to management and integration of applications into a platform and more particularly to techniques for generating and deploying integrated platform applications.

BACKGROUND

In today's technological landscape, a wide variety of software applications are available, each designed to serve specific functions across numerous industries. These applications, ranging from healthcare monitoring tools to data management systems, often operate independently, collecting and processing data in isolation. For example, a single user might rely on different applications for tracking heart rate, physical activity, and other vital health metrics, each operating as a standalone solution.

SUMMARY

While these individual software applications can provide valuable insights, their lack of integration creates significant challenges when users or organizations need to access comprehensive, real-time data across multiple platforms. The fragmentation of data across these individual software applications often results in inefficiencies, requiring users to manually consolidate and interpret data from disparate sources. This limitation highlights the growing need for integrated platforms that can streamline data aggregation, processing, and reporting, enabling more cohesive and actionable insights. In healthcare, for example, patients often rely on multiple wearable devices and applications to track health metrics such as heart rate, physical activity, and other vital signs. However, the data from these various sources are typically siloed, making it difficult for healthcare providers and patients to access a comprehensive view of an individual's health.

Despite advancements in integrated platform technologies, there are still challenges related to the secure and efficient deployment of these applications across various devices and environments. Security concerns, such as ensuring the protection of sensitive health data in compliance with regulations like HIPAA and GDPR, remain a top priority. Additionally, platforms need to be adaptable, allowing for real-time data processing and reporting even in environments with limited or no network connectivity, such as in remote healthcare settings or military operations. There is a need for integrated platform applications that can consolidate data from multiple sources, provide real-time reporting, and generate actionable insights, all while ensuring data privacy and regulatory compliance.

Provided are embodiments of integrated platform application generation and deployment that provide for the generation, deployment, and management of applications. In some embodiments, an advanced application system provides for seamless integration and management of platform applications and user data. For example, a platform generation and management system may define an integrated platform application by determining a platform API and selecting a set of platform application modules. These modules may be chosen from a set and correspond to applications deployed by platform providers. The system may, in turn, generate the integrated platform application, incorporating functionality and data from multiple applications to provide comprehensive results reports, or the like, for users. The system may also establish application standards and security protocols, conduct testing based on these criteria, and generally ensure that the application meets functional thresholds before deployment. Such an integrated platform may enable users to access consolidated data and reports across various applications, ensuring seamless, secure, and efficient data management and presentation.

Although certain embodiments are described in the context of healthcare for the purpose of explanation, embodiments may be employed in any suitable context. For example, in the military context, biometric data and local threat data that would otherwise be presented to a soldier by two separate application reports may be consolidated into a single report that is easy for the soldier to interpret, and the report data may be linked or otherwise associated in a military platform training dataset that is used to train AI models for predicting outcomes of military operations. As further non-limiting examples, embodiments may be employed in government, commerce, education, finance, agriculture, or other applications.

Provided in some embodiments is an application system including: platform data acquisition devices associated with one or more users and configured to obtain user data; platform application provider systems, each configured to deploy a platform application that is configured to, for each user of one or more users: obtain, by way of one or more platform data acquisition devices associated with the user, user data for the user; generate, based on the user data obtained for the user, application results data for the user; and provide, to a platform user device associated with the user for presentation to the user, the application results data for the user; platform user devices, each associated with a user and configured to present application results data; and a platform generation and management system configured to: determine an integrated platform application definition for an integrated platform application; determine, based on the integrated platform application definition, an integrated platform application programming interface (API) for the integrated platform application; select, based on the integrated platform definition, a set of platform application modules to be integrated into the integrated platform application, each platform application module of the set of platform application modules being selected from a predetermined set of platform application modules and corresponding to a platform application deployed by platform application provider; generate, based on the application modules selected and the platform API, the integrated platform application, the integrated platform application configured to: obtain, for each of two or more platform applications corresponding to a platform application of the set of platform application modules selected, application results data for the user generated by the platform application; consolidate the application results data obtained to generate a consolidated results report for the user; and present, via a platform user device associated with the user, the consolidated results report for the user; determine, based on the integrated platform application, application standards; determine, based on the integrated platform application, application security protocols; test, based on the application standards and the application security protocols, the integrated platform application to determine integrated platform application test results; determine whether the integrated platform application test results satisfy threshold testing criteria; and deploy, in response to determining that the integrated platform application test results satisfy threshold testing criteria, the integrated platform application.

In some embodiments, the integrated platform definition is provided by a user and defines two or more platform applications to be integrated into the integrated platform application. In some embodiments, the integrated platform application API is generated based on application of the integrated platform definition to a platform application API generation model. In some embodiments, each platform application module is generated based on application of the corresponding platform application to a platform application module generation model. In some embodiments, the application standards are generated based on application of the corresponding platform application to a platform application standards generation model. In some embodiments, the application security protocols are generated based on application of the corresponding platform application to a platform application security generation model. In some embodiments, the testing of the integrated platform application includes subjecting the integrated platform application to one or more of the following security assessments: threat modeling, static application security testing (SAST), dynamic application security testing (DAST), penetration testing, vulnerability scanning, secure configuration testing, application programming interface (API) security testing, security logging and monitoring validation, access control testing, encryption testing, patch management and dependency scanning, compliance audits, user education and social engineering testing, and automated continuous security testing. In some embodiments, the application test results include a security assessment score corresponding to the one or more security assessments that the integrated platform is subjected to, and wherein determining that the integrated platform application test results satisfy threshold testing criteria includes determining that the security assessment score satisfies a security assessment score threshold. In some embodiments, deploying the integrated platform application includes the integrated platform application executing to perform the following: obtaining, by way of each of the two or more platform applications, application results data for a given user that is generated by the two or more platform applications; consolidating the application results data for the given user obtained to generate a consolidated results report for the given user; and presenting, via a platform user device associated with the given user, the consolidated results report for the given user. In some embodiments, the results data for the user generated by the two or more platform applications is obtained via a platform user device associated with the user, and wherein the application results data for the user obtained to generate a results report for the user is consolidated locally on the platform user device, the consolidation including: obtaining, by a local instance of the integrated platform application executing on the platform user device and from local instances of the two or more platform applications executing on the platform user device, a local copy of the results data generated by the two or more platform applications; and consolidating, by the local instance of the integrated platform application executing on the platform user device, the local copy of the results data generated by the two or more platform applications, to generate the consolidated results report for the user. In some embodiments, the platform generation and management system is configured to: associate the application results data with a single user; anonymize the application results data to generate a set of anonymized data associated with a single user; and generate an application model training dataset based on the set of anonymized data associated with a single user; and train, based on the application model training dataset, an application model.

Provided in some embodiments is a method including: determining an integrated platform application definition for an integrated platform application; determining, based on the integrated platform application definition, an integrated platform application programming interface (API) for the integrated platform application; selecting, based on the integrated platform definition, a set of platform application modules to be integrated into the integrated platform application, each platform application module of the set of platform application modules being selected from a predetermined set of platform application modules and corresponding to a platform application deployed by platform application provider; generating, based on the application modules selected and the platform API, the integrated platform application, the integrated platform application configured to: obtain, for each of two or more platform applications corresponding to a platform application of the set of platform application modules selected, application results data for a user generated by the platform application; consolidate the application results data obtained to generate a consolidated results report for the user; and present, via a platform user device associated with the user, the consolidated results report for the user; determining, based on the integrated platform application, application standards; determining, based on the integrated platform application, application security protocols; testing, based on the application standards and the application security protocols, the integrated platform application to determine integrated platform application test results; determining whether the integrated platform application test results satisfy threshold testing criteria; and deploying, in response to determining that the integrated platform application test results satisfy threshold testing criteria, the integrated platform application.

In some embodiments, the integrated platform definition is provided by a user and defines two or more platform applications to be integrated into the integrated platform application. In some embodiments, the integrated platform application API is generated based on application of the integrated platform definition to a platform application API generation model, wherein each platform application module is generated based on application of the corresponding platform application to a platform application module generation model, wherein the application standards are generated based on application of the corresponding platform application to a platform application standards generation model, or wherein the application security protocols are generated based on application of the corresponding platform application to a platform application security generation model. In some embodiments, the testing of the integrated platform application includes subjecting the integrated platform application to one or more of the following security assessments: threat modeling, static application security testing (SAST), dynamic application security testing (DAST), penetration testing, vulnerability scanning, secure configuration testing, application programming interface (API) security testing, security logging and monitoring validation, access control testing, encryption testing, patch management and dependency scanning, compliance audits, user education and social engineering testing, and automated continuous security testing. In some embodiments, the application test results include a security assessment score corresponding to the one or more security assessments that the integrated platform is subjected to, and wherein determining that the integrated platform application test results satisfy threshold testing criteria includes determining that the security assessment score satisfies a security assessment score threshold. In some embodiments, deploying the integrated platform application includes the integrated platform application executing to perform the following: obtaining, by way of each of the two or more platform applications, application results data for a given user that is generated by the two or more platform applications; consolidating the application results data for the given user obtained to generate a consolidated results report for the given user; and presenting, via a platform user device associated with the given user, the consolidated results report for the given user. In some embodiments, the results data for the user generated by the two or more platform applications is obtained via a platform user device associated with the user, and wherein the application results data for the user obtained to generate a results report for the user is consolidated locally on the platform user device, the consolidation including: obtaining, by a local instance of the integrated platform application executing on the platform user device and from local instances of the two or more platform applications executing on the platform user device, a local copy of the results data generated by the two or more platform applications; and consolidating, by the local instance of the integrated platform application executing on the platform user device, the local copy of the results data generated by the two or more platform applications, to generate the consolidated results report for the user. In some embodiments, the method further including: associating the application results data with a single user; anonymizing the application results data to generate a set of anonymized data associated with a single user; generating an application model training dataset based on the set of anonymized data associated with a single user; and training, based on the application model training dataset, an application model.

Provided in some embodiments is a non-transitory computer readable medium including program instructions stored thereon that are executable by a processor to perform the following operations: determining an integrated platform application definition for an integrated platform application; determining, based on the integrated platform application definition, an integrated platform application programming interface (API) for the integrated platform application; selecting, based on the integrated platform definition, a set of platform application modules to be integrated into the integrated platform application, each platform application module of the set of platform application modules being selected from a predetermined set of platform application modules and corresponding to a platform application deployed by platform application provider; generating, based on the application modules selected and the platform API, the integrated platform application, the integrated platform application configured to: obtain, for each of two or more platform applications corresponding to a platform application of the set of platform application modules selected, application results data for a user generated by the platform application; consolidate the application results data obtained to generate a consolidated results report for the user; and present, via a platform user device associated with the user, the consolidated results report for the user; determining, based on the integrated platform application, application standards; determining, based on the integrated platform application, application security protocols; testing, based on the application standards and the application security protocols, the integrated platform application to determine integrated platform application test results; determining whether the integrated platform application test results satisfy threshold testing criteria; and deploying, in response to determining that the integrated platform application test results satisfy threshold testing criteria, the integrated platform application.

While this disclosure is susceptible to various modifications and alternative forms, specific example embodiments are shown and described. The drawings may not be to scale. The drawings and the detailed description are not intended to limit the disclosure to the form disclosed, but are intended to disclose modifications, equivalents, and alternatives falling within the spirit and scope of the present disclosure as defined by the claims.

DETAILED DESCRIPTION

Provided are embodiments of integrated platform application generation and deployment that provide for the generation, deployment, and management of applications. In some embodiments, an advanced application system provides for seamless integration and management of platform applications and user data. For example, a platform generation and management system may define an integrated platform application by determining a platform API and selecting a set of platform application modules. These modules may be chosen from a set and correspond to applications deployed by platform providers. The system may, in turn, generate the integrated platform application, incorporating functionality and data from multiple applications to provide comprehensive results reports, or the like, for users. The system may also establish application standards and security protocols, conduct testing based on these criteria, and generally ensure that the application meets functional thresholds before deployment. Such an integrated platform may enable users to access consolidated data and reports across various applications, ensuring seamless, secure, and efficient data management and presentation.

Although certain embodiments are described in the context of healthcare for the purpose of explanation, embodiments may be employed in any suitable context. For example, in the military context, biometric data and local threat data that would otherwise be presented to a soldier by two separate application reports may be consolidated into a single report that is easy for the soldier to interpret, and the report data may be linked or otherwise associated in a military platform training dataset that is used to train AI models for predicting outcomes of military operations. As further non-limiting examples, embodiments may be employed in government, commerce, education, finance, agriculture, or other applications.

Figure 1:
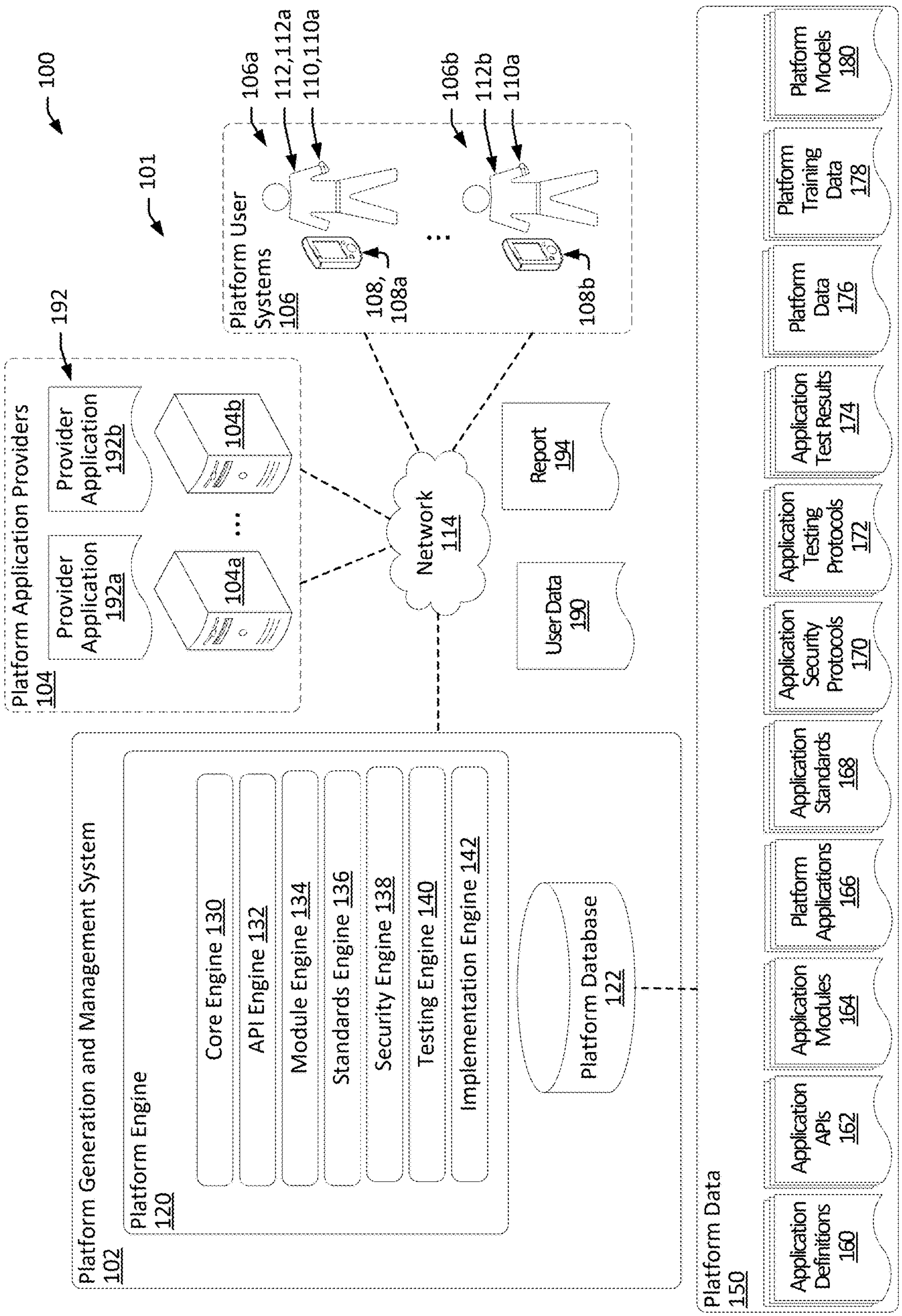
FIG. 1 is a diagram that illustrates an application environment in accordance with one or more embodiments.

FIG. 1 is a diagram that illustrates an application integration environment ("environment") 100 in accordance with one or more embodiments. In the illustrated embodiment, environment 100 includes an application generation and deployment system 101 that includes a platform generation and management system 102, platform application provider systems ("providers") 104, and platform user systems 106 (including platform user devices 108, platform data acquisition (DAQ) devices 110, and a user 112, such as a person or other entity) communicatively coupled by way of a communications network 114. The platform generation and management system 102 includes a platform engine 120 and a platform database 122. The platform engine 120 includes a core engine 130, an application programming interface (API) engine 132, a module engine 134, a standards engine 136, a security engine 138, a testing engine 140, and an implementation engine 142. Platform database 122 includes platform data 150, which includes integrated platform application definitions ("application definitions") 160, integrated platform application APIs ("application APIs") 162, platform application modules ("application modules") 164, integrated platform applications ("platform applications") 166, platform application standards ("application standards") 168, platform application security protocols ("application security protocols") 170, platform application testing protocols ("application testing protocols") 172, platform application test results ("application test results") 174, platform data 176, platform training data 178, and platform models 180.

As described, embodiments may include generating platform applications 166 that are executable to receive user data 190 for a given user 112 (e.g., data for user 112*a* obtained via platform DAQ devices 110*a*) by way of different provider applications 192 (e.g., provider applications 192*a* and 192*b* operated by providers 104*a* and 104*b*, respectively), to process the received user data 190 to generate a consolidated report 194 for the given user 112 (e.g., a single report 194 that reflects the user data 190 for use 112*a* provided by the different provider applications 192*a* and 192*b*), and to provide the consolidated report 194 to the user device 108 associated with the given user 112 (e.g., to user device 108*a*), for presentation to the given user 112 (e.g., for presentation to user 112*a* by way of a graphical user interface (GUI) of the user device 108*a*). For example, in the context of health monitoring, user 112*a* may employ a smartphone type user device 108*a* that executes health monitoring applications, including a first provider application 192*a* (e.g., a heart monitoring application) for collecting heart rate data from a smartwatch heartbeat sensor type platform DAQ device 110*a* and providing corresponding heart rate reports (e.g., including measures of resting heart rate, active heart rate, heart rate variability, and the like), and including a second provider application 192*b* (e.g., an activity monitoring application) for collecting step/activity data from a smartwatch accelerometer/gyroscopic sensor type platform DAQ device 110*a* and providing corresponding step/activity reports (e.g., including measures of step counts, distance covered, calories burned, and the like). In such an embodiment, the platform generation and management system 102 may generate and deploy a platform application 166 that is operable to obtain user data 190 corresponding to the reports (e.g., to obtain a heart rate report (or corresponding data) by way of the first provider application 192*a* (or the application provider system 104*a*) and obtain a step/activity report (or corresponding data) by way of the second provider application 192*b* (or the application provider system 104*b*), generate a consolidated report 194 for the user 112*a*, including a heart rate report and a step/activity report based on the obtained user data 190 corresponding to the reports, and provide the consolidated report 194 to the user device 108*a* for presentation to the user 112*a* by way of a graphical user interface (GUI) of the user device 108*a*.

In some embodiments, separate sets of data are associated with one another based on association with a common user 112, a training dataset that includes the separate sets of data and their association is generated, and the training dataset is used to generate platform models 180. Continuing with the health report example, the platform generation and management system 102 may, by virtue of gaining the knowledge from the first and second provider applications 192*a* and 192*b* that the user data 190 contained in the heart rate report (or corresponding data) and the step/activity report (or corresponding data) are associated with the same user, user 112*a*, generate a dataset that includes some or all of the heart rate report (or corresponding data), the step/activity report (or corresponding data), and the consolidated report 194 for the user 112*a*, associating them with one another within the dataset based on their association with a single user. Such a dataset may enable data from separate data sources (that may not otherwise reveal their association with a single user) to be associated, such that it provides an improved dataset. In some embodiments, such a dataset may be used to generate an improved training dataset that can be employed to better inform and train artificial intelligence (AI) models. Continuing with the health report example, the platform generation and management system 102 may add the associated dataset (e.g., the dataset that includes and associates some or all of the heart rate report (or corresponding data), the step/activity report (or corresponding data), and the consolidated report 194 for the user 112*a* with a single user) to platform training data 178, and the platform training data 178 may be employed by machine learning algorithms to train AI models, such as models that are capable of predicting potential health issues or the like based on patient health data. As described, data obtained, provided, or otherwise employed may be cleaned to ensure compliance with data regulations. For example, any patient data, such as user data 190 or the reports 194 described, or any associated data derived therefrom, may be anonymized to transform the data so that an individual's identity is no longer directly or indirectly recognizable from the data. This may be crucial for protecting privacy, particularly in healthcare research, data sharing, and compliance with regulations such as HIPAA (Health Insurance Portability and Accountability Act) or GDPR (General Data Protection Regulation).

In some embodiments, a platform application provider system 104 is a centralized infrastructure or service that is responsible for maintaining, deploying, or managing software applications. In the context of a network system, a platform application provider system 104 may be a centralized infrastructure or service that is responsible for maintaining, deploying, and managing software applications used by clients (e.g., users 112 or devices 108) to collect, process, and analyze data. Such a system may host, deploy, or operate various applications designed to interact with user devices and sensors, such as health monitoring applications, and deliver reports based on the collected data. For example, a platform application provider system 104 may operate one or more health monitoring provider applications 192 that interact with user devices (like smartphones and smartwatches) to gather sensor type user data 190, process it, and generate useful reports 194 for users 112. In some embodiments, a platform application provider system 104 includes a computer system, which may be the same or similar to computer system 1000 described with regard to at least FIG. 4.

In some embodiments, a user device 108 is an electronic device that provides for interaction with users. For example, a user device 108 may include a personal user device, such as a smartphone, a tablet, a laptop, a desktop PC, a smartwatch, or other portable or stationary device with which a user 108 interacts. In some embodiments, a user device 108 includes a computer system, which may be the same or similar to computer system 1000 described with regard to at least FIG. 4.

In some embodiments, a platform data acquisition (DAQ) device 110 is a device or system used to capture, process, or transmit data related to a user or the environment in which the user operates. In the context of personal devices, a DAQ device 110 may be embedded into wearable technology or other personal devices like smartwatches, smartphones, or fitness trackers. A DAQ device 110 may, for example, include various sensors, processors, and communication modules to collect, analyze, and share user-related data with other devices, platforms or applications for further analysis. A platform DAQ device 110 may, for example, include a sensor system (e.g., a heartbeat sensor, an accelerometer, a gyroscope, or the like) and the related processing unit that processes and communicates associated sensor data. Such a sensor system may include connectivity systems (e.g., Bluetooth, Wi-Fi) to share the data with external systems via a communications network (e.g., the Internet), such as mobile apps or cloud platforms for deeper analysis or user notifications. In some embodiments, a DAQ device 110 includes a computer system, which may be the same or similar to computer system 1000 described with regard to at least FIG. 4.

In some embodiments, a user 112 is a person or other entity. For example, in the context of a network system, a user 112 may be an individual, device, or other entity that interacts with the network as a client to request and use services, data, or resources provided by servers or the network infrastructure. A user 112 could be, for example, a person operating a device or a computer system acting on behalf of an individual or organization. In some embodiments, a user 112 includes a computer system, which may be the same or similar to computer system 1000 described with regard to at least FIG. 4.

Platform generation and management system 102 may be operable to perform operations of application generation and implementation described herein. For example, platform generation and management system 102 may be operable to generate and implement a healthcare platform application 166 that is operable to generate consolidated health reports 194 based on user data 190 obtained by way of different provider applications 192. In such an embodiment, the platform generation and management system 102 may be operable to generate platform training data 178 that includes or otherwise reflects the obtained user data 190 and derived associations thereof, and employ the platform training data 178 to train associated healthcare platform models 180. Such embodiments may provide for consolidating and reporting data obtained by way of different provider applications 192, whereby the consolidated data and derived relationships can be used during model training to generate improved platform models 180. In some embodiments, system 102 includes a computer system, which may be the same or similar to computer system 1000 described with regard to at least FIG. 4.

In some embodiments, the core engine 130 is a software module operable to receive one or more inputs indicative of a type of application to be developed (e.g., definitions of types of inputs to be provided and outputs to be generated, or the like), and to generate, based thereon, an application definition 160 that is indicative of the type of application to be developed (e.g., an application definition indicating a speech recognition system, a text-based conversational interface, or the like). The core engine 130 may be operable to automate the process of generating application definitions 160 based on specified criteria, allowing for the efficient development of various types of applications, particularly those involving user interactions like speech recognition or conversational interfaces. For example, the core engine 130 may automate the process of defining a healthcare-type application (e.g., an application for generating health-type reports), allowing users to easily specify the type of data they want to track and the format of the generated healthcare reports, defining criteria for a personalized health tracking app tailored to the user's specific needs. The core engine 130 may, for example, be employed to facilitate the creation of a healthcare-type platform application 166 that generates a detailed healthcare-type report 194 based on user input (e.g., input of an end user 112 or an operator/user of platform generation and management system 102, such as an application developer). This may involve receiving user input, including the user 112 interacting with the core engine 130 by providing inputs indicative of the type of healthcare platform application they want to develop. The user 112 may, for example, specify that the healthcare platform application should focus on generating a healthcare report that tracks heart rate and activity metrics. Such input might include definitions such as the following: heart rate metrics to include (e.g., resting heart rate, active heart rate, heart rate variability), step and activity metrics to include (e.g., step counts, distance covered, calories burned). The process may further involve processing the input, including, upon receiving these inputs, the core engine 130 processing the data and identifying the components to develop the specified healthcare application, recognizing that the application must integrate various data sources, such as wearable devices or health monitoring systems, capable of measuring heart rate and activity metrics. The process may further involve generating a corresponding application definition 160, which may include, based on the user input, the core engine 130 generating an application definition that outlines the structure and functionality of the healthcare application. Such an application definition 160 may, for example, specify the following: the types of health data to be collected (e.g., heart rate data, step/activity data); the methods for capturing and processing the data (e.g., through integration with a wearable device or health tracker); the format of the healthcare report to be generated, which includes sections for: heart rate reports: presenting metrics such as resting heart rate, active heart rate, and heart rate variability, allowing the user to monitor cardiovascular health; step/activity reports: presenting metrics such as step counts, distance covered, and calories burned, offering insights into the user's physical activity levels. The process may further involve outputting the application definition 160, which may include the core engine 130 outputting the healthcare application definition 160, which provides a detailed guide for developing a corresponding healthcare platform application 166. Such an application definition 160, may, for example, be used by developers to generate and implement the corresponding healthcare platform application 166, ensuring that it meets the user's specifications for tracking and reporting heart rate and activity metrics.

In some embodiments, the core engine 130 implements one or more machine learning-based AI models. For example, the core engine 130 may apply user inputs to an application definition generation AI model (e.g., of models 180) to assist with generating the application definition. Continuing with the healthcare-type application example, the core engine 130 may leverage natural language processing (NLP) models to interpret user inputs more effectively. For example, when a user provides a request for a healthcare application (e.g., "I need an app that tracks heart rate and activity metrics"), the application definition generation AI model may parse and understand the natural language inputs, identify key components from the input, such as the need for heart rate reports (e.g., resting heart rate, active heart rate) and activity metrics (e.g., step counts, distance, calories burned), and recognize related features that could be beneficial to the user (e.g., incorporating trends or health alerts based on abnormal heart rate readings). As another example, the application definition generation AI model may provide recommendations based on historical data and common user preferences. For example, the machine learning algorithm may be trained on data from prior similar application requests and be operable to suggest additional features that users typically request with similar apps, such as integrating sleep tracking or suggesting exercise recommendations based on heart rate variability. Such a model may optimize the recommended application structure based on patterns it has learned from past successful healthcare apps, helping to generate an optimized application definition that may include the most effective data sources (e.g., using specific APIs or integrating with popular health devices). As another example, the application definition generation AI model may tailor the application definition to the user's requests. For example, the application definition generation AI model may be trained on large datasets of various application types and their corresponding definitions, such that when the user provides inputs indicating the type of application they want to develop, the model matches the input with similar existing applications and generates a tailored application definition (e.g., if a user requests a healthcare app focused on heart rate and activity, the model could reference successful applications that have similar features to automatically recommend the best practices for structuring the app), automatically determine the types of data models needed (e.g., a time-series model for analyzing heart rate data trends or regression models to predict calorie expenditure based on activity levels), or generate relevant code templates, frameworks, or system architectures based on user needs and previous examples. In some embodiments, the application definition generation AI model may learn from interactions with users to improve the accuracy and efficiency of its outputs. For example, it may employ feedback loops where, as users continue to interact with the core engine 130, the model receives feedback on the generated application definitions, and learns from this feedback, adapting its recommendations and improving its ability to generate more precise application definitions in the future.

In some embodiments, the API engine 132 is a software module that is operable to receive one or more inputs indicative of an application definition (e.g., an application definition indicating a speech recognition system, a text-based conversational interface, or the like), and to generate, based thereon, an application API 162 therefor (e.g., an API defining interactions with users or applications, for example, defining how inputs and outputs will be received, output, or the like). The API engine 132 may automate the process of creating a custom application API 162 that governs how an application interacts with its environment, based on the application's functional definition, which may ensure that the application can effectively receive inputs, process them, and deliver outputs in a consistent and usable manner. Continuing with the healthcare-type application example, the API engine 132 may be employed to generate an application API 162 that defines the interactions between a healthcare-type platform application (e.g., and its users (e.g., users 112), as well as other systems or devices (e.g., devices 108 and 110, such as personal user devices and wearable health trackers). In such an embodiment, the API engine 132 may receive the application definition 160 generated by the core engine 130 (such as that described above) that specifies that the healthcare application will provide reports on heart rate and activity metrics. Based on the received application definition, the API engine 132 may generate an application API 162 that defines the structure for how the healthcare application will interact with both users and external systems. This may include endpoints and methods to handle data input, processing, and output. For example, the application API 162 may include the following: endpoints to receive data from external health tracking devices, such as heart rate monitors and activity trackers; definitions of how the app will process incoming data; definitions of methods to validate the data, ensure proper formatting, and store it securely in the backend; definitions of mechanisms for aggregating heart rate data to calculate heart rate variability, analyze trends, and generate reports; definitions of methods for outputting the processed health data in a user-friendly format; endpoints that allow the healthcare application to interact with third-party services, such as fitness apps or medical platforms (e.g., the API 162 may allow the healthcare application to share heart rate data with a third-party medical provider or export activity data to a third-party fitness application). Such an application API 162 may, for example, incorporate security measures into the generated API to protect sensitive health data, including authentication and authorization protocols, such as OAuth2.0 or API keys to ensure that only authorized devices and users can send or receive data, or encryption of sensitive data (e.g., heart rate metrics, user identifiers) during transmission and storage, in compliance with healthcare privacy regulations (e.g., HIPAA). The application API 162 may, for example, generate customizable endpoints depending on user roles (e.g., patients can access their personalized reports and receive alerts, healthcare providers can access aggregated patient data for monitoring purposes, and administrators can manage app configurations, such as setting thresholds for alerts on abnormal heart rate readings. Such an application API 162 may receive the healthcare application definition 160 and generate a corresponding application API 162 that defines how the platform application 166 is to interact with users, collect and process health data, and deliver heart rate and activity reports, ensuring that the platform application 166 can smoothly integrate with health tracking devices, provide valuable insights to users 112, and meet privacy and security requirements.

In some embodiments, the API engine 132 implements one or more machine learning-based AI models. For example, the API engine 132 may apply an application API generation AI model (e.g., of models 180) to assist with generating an application API 162 based on an application definition 160. Continuing with the healthcare application example, the API engine 132 may leverage a machine learning model to understand and parse the application definition 160, identifying specific functionality required (e.g., heart rate and activity tracking) and the types of data to be processed (e.g., resting heart rate, step counts, calories burned). The API generation AI model may then suggest optimized API endpoints based on patterns it has learned from prior similar applications. For example, based on previous healthcare apps, the AI model may recommend creating specific endpoints for receiving heart rate data, step data, and generating health reports. As another example, the API generation AI model may provide recommendations for customizing the API structure based on user-specific requirements. For instance, the API generation AI model may analyze the application definition and suggest additional API features such as real-time health monitoring or periodic report generation based on heart rate trends or user activity patterns. Such a customization may ensure the API is structured for the unique needs of the healthcare application, such as dynamically adapting to different types of user devices (e.g., smartwatches, smartphones, or health trackers). The API generation AI model may also optimize the performance of the API by analyzing historical data related to API usage and response times. For example, based on previous similar applications, the API generation AI model may recommend caching strategies, rate limiting, or other performance optimizations to handle large volumes of health data efficiently, or the model may suggest the most efficient data transfer formats (e.g., JSON or XML) based on the healthcare application's requirements and the devices it interacts with. In some embodiments, the API generation AI model may learn from interactions with users and developers to improve its recommendations and outputs. For example, it may employ feedback loops where, as users interact with the API engine 132 and provide feedback on the generated application APIs 162, the API generation AI model adapts its suggestions to improve API endpoint structures, error-handling mechanisms, or data security protocols. This learning process allows the API engine 132 to continuously enhance the application APIs 162 it generates, ensuring that future applications can benefit from more efficient, secure, and scalable APIs.

In some embodiments, the module engine 134 is a software module operable to receive one or more inputs indicative of one or more application modules (e.g., a knowledge base management module, an engagement chatbot module, a training module, risk assessment module, a data analysis module, a compliance assistant module, a communications module, a response module, or the like), and to generate, based thereon, one more corresponding application modules. These modules may be modular in that they can be added, removed, or modified to generate a module-based application that can, for example, be implemented and modified over time. The module engine 134 may be operable to automate the creation and selection of flexible, modular components that can be customized to build and modify applications over time, making it highly adaptable for various purposes and evolving needs. Continuing with the healthcare-type application example, the module engine 134 may be employed to generate a platform application 166 by selecting relevant application modules 164 based on the application API 162 generated by the API engine 132 (as described above). In such an embodiment, the module engine 134 may receive the application API 162, which defines how the healthcare platform application 166 will interact with users (e.g., users 112) and external systems or devices (e.g., user devices 108, DAQ device 110, or the like). Based on this, the module engine 134 may select various application modules 164 that align with the required functionality for the healthcare application. These modules may be designed to be modular, meaning they can be easily added, removed, or modified to create the desired platform application. For instance, in one embodiment, the module engine 134 may select modules that correspond to third-party applications. This might include a heart rate module corresponding to a first provider application 192*a* for collecting heart rate data from a smartwatch heartbeat sensor platform DAQ device 110*a*, which provides heart rate reports (e.g., resting heart rate, active heart rate, heart rate variability). Another could be a step/activity module that corresponds to a second provider application 192*b*, which collects step and activity data from the same smartwatch's accelerometer/gyroscopic sensors and generates step/activity reports (e.g., step counts, distance covered, and calories burned). By selecting these third-party app modules, the module engine 134 may integrate them into the platform application 166, allowing it to leverage data from different providers and deliver consolidated reports to users. In another embodiment, the modules may not be pre-existing but may be generated based on third-party applications. In this case, the module engine 134 may analyze the third-party apps (e.g., the first provider application 192*a* for heart rate data and the second provider application 192*b* for activity data) and generate corresponding modules that mirror or interact with their functionalities. For example, based on the features of a third-party heart rate application, the module engine 134 may generate a heart rate module that those replicates (or interfaces with) the functionalities of a third-party heart health application to collect similar data from wearable devices, processes the data, and provide comprehensive heart rate reports. Similarly, the module engine may generate a step/activity tracking module that replicates (or interfaces with) the functionalities of a third-party fitness app, offering users detailed activity reports based on the accelerometer/gyroscope data. Once the relevant modules have been selected or generated, the module engine 134 may integrate them into a cohesive platform application 166. Such a platform application may, for example, provide heart rate and activity tracking through the modules associated with third-party apps or generated from them. As described, the platform application 166 may be operable to consolidate heart rate data and activity metrics, presenting users with detailed, combined reports. Additionally, the platform application 166 may include other functionalities, such as real-time engagement through a chatbot module, risk monitoring via a risk assessment module, and ensuring compliance with healthcare data privacy regulations through a compliance assistant module. The modular nature of the platform application 166 may allow it to evolve over time. Future updates could include the addition of new third-party applications, or the generation of new modules based on emerging technologies. The module engine 134 may enable the platform to seamlessly integrate these new functionalities without disrupting the existing system, ensuring continued flexibility and scalability of the healthcare platform application 166.

In some embodiments, the module engine 134 implements one or more machine learning-based AI models to assist with selecting and generating application modules 164 and integrating them into the platform application 166. For example, the module engine 134 may apply a platform application module generation AI model (e.g., of models 180) to understand and parse the application API 162 provided by the API engine 132. Continuing with the healthcare-type application example, the AI model may interpret the API, identifying the specific data types (e.g., heart rate, activity data) being collected and processed, allowing the module engine 134 to select or generate appropriate modules. For instance, the platform application module generation AI model may recognize that the API requires heart rate tracking, and therefore suggest a heart rate monitoring module that can interact with a third-party heart rate application, such as the first provider application 192*a*. In this case, rather than merely replicating the functionality of the third-party app, the module may integrate with the app by receiving data from the app, processing it, and providing enhanced heart rate reports. As another example, the platform application module generation AI model may recommend modules based on patterns learned from previous applications. For instance, the platform application module generation AI model might suggest a step/activity tracking module that interacts with the second provider application 192*b*, which collects activity data from a smartwatch's accelerometer. The step/activity tracking module may not just duplicate the application functionality but may enhance it by consolidating step count and activity data from the second provider app with other health data (e.g., heart rate from the first provider app) to generate a comprehensive health report 194 for users 112. In some embodiments, the module engine 134 may utilize the AI model to generate new modules that interact with third-party applications. For example, if the healthcare application requires integration with both the first provider app (for heart rate) and the second provider app (for activity tracking), the platform application module generation AI model may create modules that actively communicate with these apps through their APIs. Such modules may, for example, pull in data, ensure that it is processed in the proper format, and generate consolidated reports that combine heart rate and step/activity data. This interaction could include real-time syncing, where the module collects updates from the third-party apps as new data is available (e.g., syncing heart rate data from the first provider app in real time while processing step count data from the second provider app daily). The platform application module generation AI model may also optimize the integration of these third-party app modules into the platform application 166. For instance, based on past performance of similar integrations, the application module generation AI model might suggest ways to improve the interaction between the third-party apps and the generated modules, such as improving the data exchange process to minimize latency or creating seamless user experiences where the third-party apps' data is instantly reflected in the platform's health reports. In some embodiments, the platform application module generation AI model may also manage updates to the modules as the third-party apps evolve. For example, if the first provider application adds a new feature for tracking additional heart health metrics, the platform application module generation AI model may recommend updates to the heart rate monitoring module to incorporate these new features into the platform application 166. By incorporating machine learning, the module engine 134 may automate and optimize the process of selecting, generating, and integrating application modules that interact with third-party apps, ensuring that the platform application 166 is not only comprehensive and efficient but also capable of leveraging external app functionalities to enhance the overall user experience.

In some embodiments, the standards engine 136 is a software module operable to receive one or more inputs indicative of an application definition, application API, or one or more application modules and to generate, based thereon, application standards and documentation. Such standards and documentation may, for example, accompany a resulting module-based application during other phases of its lifecycle, such as testing and implementation, to assist persons and systems in understanding operation of the module-based application or components thereof. The standards engine 136 may be operable to automate the creation of detailed documentation to ensure consistency, clarity, and support throughout the lifecycle of the application, enabling efficient development, testing, implementation, and future maintenance. In some embodiments, the standards engine 136 is employed to generate a comprehensive set of standards and documentation based on the platform application 166 created by the module engine 134. Continuing with the healthcare-type application example, the standards engine 136 may receive inputs from key components of the platform application, including the application definition 160, the application API 162, and the various application modules 164 (e.g., heart rate monitoring, step/activity tracking, chatbot engagement, and risk assessment modules), which may provide details about the platform applications functionality, such as how it collects, processes, and reports health data, and how it interacts with third-party services and devices like smartwatches and associated third-party applications. Based on these inputs, the standards engine 136 may generate detailed standards and documentation that serve as a guide for the platform application 166 throughout its lifecycle. Such documentation may include technical standards outlining how the various application modules 164 are implemented and integrated with external devices, ensuring proper communication with health monitoring systems. The documentation may also include API documentation, which describes the structure and usage of the application API 162, including endpoints for collecting heart rate data from the first provider application 192*a* and activity data from the second provider application 192*b*. Such API documentation may, for example, be designed for developers and third-party services to ensure proper interaction with the platform application 166, secure data transmission, and efficient integration. Additionally, the standards engine 136 may generate module-specific documentation that details the functionality of each module within the platform application 166. For example, the documentation may describe how the heart rate monitoring module processes data from a smartwatch's heartbeat sensor or how the risk assessment module uses collected data to flag potential health risks. This detailed documentation may provide operational information for users, developers, and healthcare providers, ensuring they understand how to interact with and manage the platform application 166 effectively. The documentation generated by the standards engine 136 may support the healthcare application through various phases of its lifecycle, including testing, implementation, and ongoing maintenance. During testing, it may provide test cases and validation criteria for verifying the app's functionality, such as ensuring accurate heart rate tracking and secure data handling. During implementation, it may assist developers and administrators with deploying the app across different devices, ensuring proper integration with wearable health trackers and other systems. Additionally, it may offer guidelines for maintaining compliance with healthcare data regulations like HIPAA, ensuring that user data is securely handled, encrypted, and stored. The standards engine 136 may ensure that the healthcare platform application 166 is well-documented, secure, and compliant throughout its entire lifecycle, which may enables developers, administrators, and users to efficiently implement, test, maintain, and scale the platform application 166 with a clear understanding of its functionality and operation.

In some embodiments, the standards engine 136 implements one or more machine learning-based AI models to assist with generating standards and documentation for the platform application 166. For example, the standards engine 136 may apply a platform application standards generation AI model (e.g., of models 180) to automatically process inputs from the application definition 160, the application API 162, and the application modules 164 to generate comprehensive documentation and standards. Continuing with the healthcare application example, the platform application standards generation AI model may analyze the application definition, which includes the key functionalities such as heart rate and activity tracking, and determine the necessary standards for each component's implementation, usage, and compliance. For instance, the platform application standards generation AI model may process the application API 162, identifying key endpoints for collecting health data (e.g., heart rate and step counts from smartwatches). Based on this, the platform application standards generation AI model may automatically generate API documentation that includes descriptions of these endpoints, how data should be formatted and transmitted, and security protocols that must be followed (e.g., encryption for healthcare data). This documentation could be tailored for both developers integrating with the application API 162 and healthcare providers using the system. Additionally, the platform application standards generation AI model may analyze the various application modules 164, such as the heart rate monitoring module and step/activity tracking module, to generate specific documentation detailing how these modules interact with each other and with external systems. For example, the platform application standards generation AI model may produce a guide for how the heart rate module processes data from a smartwatch, ensuring developers and administrators have clear instructions for proper implementation. In some embodiments, the platform application standards generation AI model may also optimize the documentation generation process by learning from past documentation outputs. For example, based on feedback from previous healthcare applications, the platform application standards generation AI model may improve its ability to generate clearer, more concise documentation, focusing on the most critical aspects of the platform for different user roles (e.g., technical documentation for developers vs. user-friendly guides for healthcare professionals). The platform application standards generation AI model may further ensure that the documentation generated by the standards engine 136 complies with healthcare industry regulations, such as HIPAA. For instance, it may automatically include guidelines for data security and privacy, such as encryption standards for patient data and instructions for securing access to the platform. Additionally, the platform application standards generation AI model may provide ongoing updates to the documentation as new regulations or technologies emerge, ensuring that the platform application remains compliant over time. The standards engine 136 may automate and optimize the creation of comprehensive standards and documentation for the platform application 166. This may include generating detailed technical documentation, API usage guides, and regulatory compliance instructions, ensuring that all stakeholders—developers, administrators, and healthcare providers—have a clear understanding of how the platform application 166 operates and adheres to industry standards.

In some embodiments, the security engine 170 is a software module operable to receive one or more inputs indicative of an application definition, application API, one or more application modules, or associated application standards and documentation, and to generate, based thereon, application security/protection procedures. Such application security/protection procedures may, for example, accompany a resulting module-based application during other phases of its lifecycle, such as testing and implementation, to define application security/protection procedures to be implemented during the associated phases. The application security engine 138 may automate the creation of comprehensive security protocols to protect the platform application 166 and its data throughout its entire lifecycle, ensuring that it is built, tested, and deployed with robust security measures in place. In some embodiments, the application security engine 138 is employed to generate a set of application security protocols 170 based on the platform application 166 created by the module engine 134. Continuing with the healthcare-type application example, the security engine 138 may receive inputs of the application definition 160, the application API 162, the various application modules 164, and the application standards 168, which provide details on the platform application's 166 structure, functionality, and how it interacts with external devices (e.g., smartwatches for heart rate and step tracking) and third-party services (e.g., healthcare providers). Based on these inputs, the security engine 138 may generate a comprehensive set of application security and data protection protocols that are outlined in the set of application security protocols 170. The set of application security protocols 170 may establish authentication protocols, such as OAuth2.0 or multi-factor authentication, to ensure that only authorized users, such as patients, healthcare providers, and administrators, can access sensitive health data. The set of application security protocols 170 may also define encryption standards for protecting personal health information (PHI), ensuring that all heart rate and activity data collected from wearables is encrypted both in transit and at rest, in compliance with healthcare privacy regulations like HIPAA. Additionally, the set of application security protocols 170 may include access control policies that specify which user roles (e.g., patients, healthcare providers, system administrators) have permission to view or modify specific data or functionalities within the platform. For instance, patients may have access to their own health data and reports, while healthcare providers can access aggregated patient data for analysis, and administrators can manage the overall system configuration. The set of application security protocols 170 may also define data protection protocols for securely storing and processing data from the first provider application 192*a* (heart rate data) and second provider application 192*b* (step and activity data), ensuring that no unauthorized third parties can access this information. Such security protocols may accompany the healthcare platform application 166 throughout its lifecycle. During testing, the set of application security protocols 170 may include procedures for security assessments for identifying and mitigating vulnerabilities, such as penetration testing or stress tests to ensure that the platform's encryption and access controls are effective. During implementation, the set of application security protocols 170 may guide developers and system administrators in securely deploying the application, ensuring that all security measures are properly configured and operational.

In some embodiments, the security engine 138 implements one or more machine learning-based AI models to assist in generating and optimizing security protocols for the platform application 166. For example, the security engine 138 may apply a platform application security generation AI model (e.g., of models 180) to analyze inputs from the application definition 160, application API 162, application modules 164, and the standards 168. Continuing with the healthcare application example, the platform application security generation AI model may evaluate how sensitive data, such as heart rate and activity metrics, is collected, transmitted, and stored, and then automatically generate robust security protocols tailored to these requirements. For instance, the platform application security generation AI model may analyze the application API 162 and identify potential security vulnerabilities, such as insecure data transmission paths between the application and wearable devices. Based on this analysis, the platform application security generation AI model may recommend or automatically generate encryption protocols to ensure that all sensitive data—such as heart rate and step data from smartwatches—is encrypted during transmission and storage. It may also suggest or implement authentication mechanisms like multifactor authentication (MFA) or OAuth2.0 to protect access to the platform application 166, ensuring that only authorized users, such as healthcare providers and patients, can access the platform application 166. Additionally, the platform application security generation AI model may process the various application modules 164, such as the heart rate monitoring and activity tracking modules, to identify potential data privacy risks. For example, the platform application security generation AI model may assess the flow of personal health information (PHI) between the modules and third-party applications, recommending access control policies that limit which users and systems can access sensitive data. The platform application security generation AI model may analyze historical security incidents or industry-wide threats to suggest preventive measures, such as regularly rotating encryption keys or implementing more stringent role-based access controls. In some embodiments, the platform application security generation AI model further optimizes security protocols by learning from past application deployments and user behavior. For instance, the platform application security generation AI model may detect patterns in common security threats (e.g., attempted unauthorized access or data breaches) and continuously update security policies to mitigate these risks. It may also recommend periodic security audits and updates based on evolving compliance regulations (e.g., HIPAA or GDPR) to ensure that the healthcare platform application 166 remains compliant over time. The platform application security generation AI model may also assist in automated security testing, generating test cases to simulate attacks or vulnerabilities. This may include, for example, penetration testing and stress testing the system to evaluate how well the platform application 166 handles security threats. By employing machine learning, the security engine 138 may ensure that the healthcare platform application 166 is protected against a wide range of threats, while adapting to new risks and maintaining data protection throughout the platform application's 166 lifecycle. Such a machine learning-based platform application security generation AI model may enhance the application security protocols 170 by automating the analysis of potential vulnerabilities, recommending encryption and authentication protocols, optimizing access control policies, and continuously improving security measures, which may allow the healthcare platform application 166 to maintain robust protection of sensitive health data while adapting to emerging threats and regulatory changes.

In some embodiments, the testing engine 140 is a software module operable to receive one or more inputs indicative of an application definition, application API, one or more application modules, associated application standards and documentation, or application security/protection procedures, and to perform, based thereon, associated testing of the module-based application or components (e.g., modules) thereof. Such testing may, for example, be accomplished in accordance with the inputs, and generate corresponding application test results 174 that can be assessed to determine an associated performance of the module-based application. The test results 174 may, for example, be used as a basis for validating or modifying the module-based application. In some embodiments, the testing engine 140 is employed to generate a comprehensive set of test results 174 for the platform application 166, ensuring its functionality, security, and performance. Continuing with the healthcare-type application example, the testing engine 140 may receive inputs of the application definition 160, the application API 162, the various application modules 164 (such as heart rate monitoring and activity tracking), the application standards 168, and application security protocols 170, which may provide the details to conduct rigorous testing and ensure that the healthcare platform application 166 is robust, secure, and compliant with industry standards. Based on these inputs, the testing engine 140 may perform a wide range of security assessments, including various tests, to evaluate the application 166. For example, threat modeling may be conducted to identify potential security risks and vulnerabilities in the application's 166 architecture, such as how sensitive health data is transmitted and stored. Static application security testing (SAST) may be used to examine the source code of the application 166, identifying potential flaws such as insecure coding practices or data leaks. Dynamic application security testing (DAST) may be conducted to assess the application's 166 behavior during runtime, ensuring that it handles inputs and outputs securely when interacting with wearable devices and third-party services. The testing engine 140 may also perform penetration testing, simulating attacks on the application 166 to identify exploitable weaknesses, such as unauthorized access to patient data. Vulnerability scanning may be employed to detect known security vulnerabilities in the application 166, while secure configuration testing verifies that the application's 166 configurations (e.g., database settings, access controls) adhere to security best practices. Additionally, API security testing may be employed to ensure that the application 166 (and its API 162) securely handles the exchange of heart rate and activity data between the application 166 and external devices like smartwatches. Other assessments may include security logging and monitoring validation, which ensures that the application 166 is capable of tracking and detecting potential security incidents in real-time. Access control testing may verify whether user roles and permissions are correctly enforced, ensuring that only authorized users, such as patients and healthcare providers, can access sensitive health information. Encryption testing may ensure that personal health information (PHI) is properly encrypted during transmission and storage, ensuring compliance with healthcare privacy regulations like HIPAA. The testing engine 140 may also conduct patch management and dependency scanning to identify outdated software components that may introduce vulnerabilities and ensure that they are regularly updated. Compliance audits may ensure that the platform meets regulatory requirements such as HIPAA or GDPR, while user education and social engineering testing helps assess the application's 166 defenses against phishing and other social engineering attacks. Automated continuous security testing may ensure that ongoing assessments are in place to catch any emerging vulnerabilities as the application 166 evolves or new modules 164 are added. The testing engine 140 may generate a set of test results 174 based on the outcomes of the testing. Such results may provide detailed feedback on each test's performance and can be used to assess the readiness of the healthcare platform application 166. In some embodiments, the test results 174 may include individual scores for each test or assessment. For example, the platform may receive a score for penetration testing (e.g., 85/100), a score for encryption testing (e.g., 95/100), and a score for API security testing (e.g., 90/100). Each score reflects the application's 166 ability to pass that specific test and highlights areas that may require improvement. In some embodiments, the test results 174 may include a composite test score, that, for example, aggregates the results from multiple assessments to provide an overall security or performance score for the application 166. For example, after running all the security and performance tests, the application 166 might receive a composite security score of 92/100, indicating strong overall security but with some areas requiring additional attention, such as minor vulnerabilities identified in the penetration test or the API security test. Such test results 174 may validate that the healthcare application 166 operates as expected and may also guide developers in addressing any weaknesses. For example, if the application 166 receives a lower score in vulnerability scanning, developers can focus on patching those vulnerabilities to improve the score and overall security. Similarly, if a compliance audit reveals gaps in meeting HIPAA requirements, the test results 174 will help guide the necessary adjustments to ensure the application 166 is compliant.

In some embodiments, the implementation engine 142 is operable to receive one or more inputs indicative of a module-based application (or associated components, such as an application definition, application API, one or more application modules, associated application standards and documentation, or application security/protection procedures, or test results), and to implement, based thereon, the module-based application. Such implementation may, for example, include deploying the module-based application 166 (e.g., on a client computer system) to execute a corresponding application to be provided by the module-based application (e.g., a speech recognition system, a text-based conversational interface, or the like). In some embodiments, an application 166 may be implemented only after it has been subjected to testing in accordance with associated application testing protocols 172 and the test results 174 indicate that the application 166 has passed testing and is ready for implementation (e.g., that all of its security scores satisfy a corresponding minimum threshold or that its composite security score satisfies a corresponding minimum threshold).

In some embodiments, the implementation engine 142 is employed to deploy the healthcare platform application 166 after it has passed all necessary tests and validations. Continuing with the healthcare-type application example, the implementation engine 142 may receive inputs from various components of the platform, including the application definition 160, the application API 162, the application modules 164 (such as the heart rate monitoring module, step/activity tracking module, and risk assessment module), the application standards 168, application security protocols 170, application testing protocols 172, and the test results 174 generated by the testing engine 140. These inputs ensure that the application 166 is ready for deployment and meets all functional, security, and compliance requirements. Once the necessary inputs are received, the implementation engine 142 proceeds with deploying the healthcare platform application 166. This may involve setting up the application in a cloud environment (e.g., operated by the platform generation and management system 102), integrating it with external devices (e.g., smartwatches or fitness trackers) that collect heart rate and activity data, and configuring the application API 162 to ensure seamless communication between the application 166, wearable devices, and third-party systems (e.g., healthcare providers or medical records systems). The deployment process ensures that each application module 164—such as the heart rate monitoring and activity tracking modules—operates as designed and can securely receive, process, and store user data 190 in compliance with regulations like HIPAA. In this healthcare application example, the implementation engine 142 ensures that the platform is only deployed once it has passed all associated testing protocols and meets the required security standards. For example, if the test results show that the platform has achieved minimum security scores for critical aspects such as encryption testing, API security, and access control, or that its composite security score exceeds a predefined threshold, the engine will move forward with the deployment. This may ensure that the healthcare platform application 166 is secure and reliable, minimizing any risks associated with handling sensitive health data. Once deployed, the application 166 may be fully operational, allowing users 112 to access real-time heart rate and activity data, corresponding health reports, and to monitor risks in a secure environment. The implementation engine 142 ensures that all necessary configurations are in place for the application 166 to function smoothly across various devices and systems.

Referring again to FIG. 2 and various types of modules 164, in some embodiments, a knowledge base management module is an AI based data management application that is operable to automatically categorize vast amounts of data, such as research papers, environmental reports, and global databases. When, for example, an agency employee needs information about a specific species, the module retrieves relevant data, latest research findings, and conservation efforts. This data may empower a user to make informed decisions and implement effective environmental policies. Such a module may streamline knowledge bases, empowering teams to make informed decisions and drive better outcomes, facilitating fast information retrieval and knowledge management. Users may, for example, be able to easily access vast amounts of data, with relevant information at their fingertips.

In some embodiments, an engagement chatbot module is an AI based chatbot application that is operable to understand natural language and learn from previous interactions. When, for example, a user seeks assistance, the chatbot module can promptly answer queries about various government services and programs, or proactively offer personalized recommendations based on citizens' past interactions, leading to improved satisfaction and greater efficiency in public services. Such a module may transform user engagement, for example, handling routine inquiries, offering prompt and precise responses to users. This may help to eliminate long waiting times and human agent overload, as the chatbot module provides enhanced service.

In some embodiments, a training module is an AI based training application that is operable to provide an onboarding process with interactive and personalized training modules. Such an onboarding process may include simulating real-life scenarios, providing hands-on guidance to new employees, and the like, which can provide for faster skill development and seamless integration into a group, such as a workforce.

In some embodiments, a risk assessment module is an AI based risk assessment application that is operable to perform deep analysis of network traffic, system logs, and security events. Such an application may, for example, be employed to identify anomalous patterns indicative of cyber threats and vulnerabilities that may go unnoticed by traditional security measures. By proactively detecting and mitigating risks, the application may help to ensure the protection of sensitive data. Such an application may provide an extra layer of protection against potential risks and security vulnerabilities. By analyzing complex data, for example, such an application may identify crucial insights that may elude human experts and provide proactive security measures.

In some embodiments, a data analysis module is an AI based data analysis application that is operable to introduce an intuitive voice-activated data analysis interface for users handling vast datasets. Users may, for example, simply speak queries, and the application may retrieve and present relevant information in real-time. Such a natural language interaction may eliminate the need for complex data querying and empower users with actionable insights. Such an application may provide a friendly natural language interface for accessing and querying databases. Users may, for example, interact with data conversationally, making data retrieval and analysis seamless and user-friendly.

In some embodiments, a compliance assistant module is an AI based chat assistant application that is operable to ensure entity adherence to ever-evolving compliance guidelines. For example, in a healthcare regulatory agency, the application may answer questions from healthcare providers about new regulations and compliance requirements. Such interactive queries and responses may help to reduce confusion, facilitate smooth compliance, and strengthen the overall healthcare system. Such an application may help reduce challenges associated with compliance with regulations and policies. For example, such an application may swiftly answer questions related to compliance guidelines, reducing confusion and minimizing errors, enabling users to stay ahead of compliance requirements with ease.

In some embodiments, a communications module is an AI based communication application that is operable to provide communications between persons speaking different languages, such as communicating with non-English speakers. Such an application may, for example, translate official documents, policy updates, and citizen information into multiple languages, ensuring inclusivity and accessibility for all users.

In some embodiments, a response module is an AI based response application that is operable to establish a central crisis communication hub during emergencies. Such an application may, for example, process incoming data from various sources, answering users frequently asked questions, and providing real-time updates on evacuation routes, safety protocols, and available resources. By being a reliable and fast source of information, such an application may aid in saving lives and ensuring users well-being during critical times.

As noted, the above are examples of applications modules and operations that may be employed. Embodiments may include and employ any suitable application modules and associated operations.

The described embodiments of application modules 164 and associated processing and generation of data by system 102 within environment 100 may provide an AI based application integration and management that generates a integrated platform application 166 that incorporates one or more application modules 164. Such an application 166 may be implemented to provide and execute a modular platform that can be used to harness the power of AI with a unique level of customization that enables the system 102 and its applications (e.g., modules 164 and the implemented application) to be easily molded to fit unique and ever-changing requirements.

Figure 2:
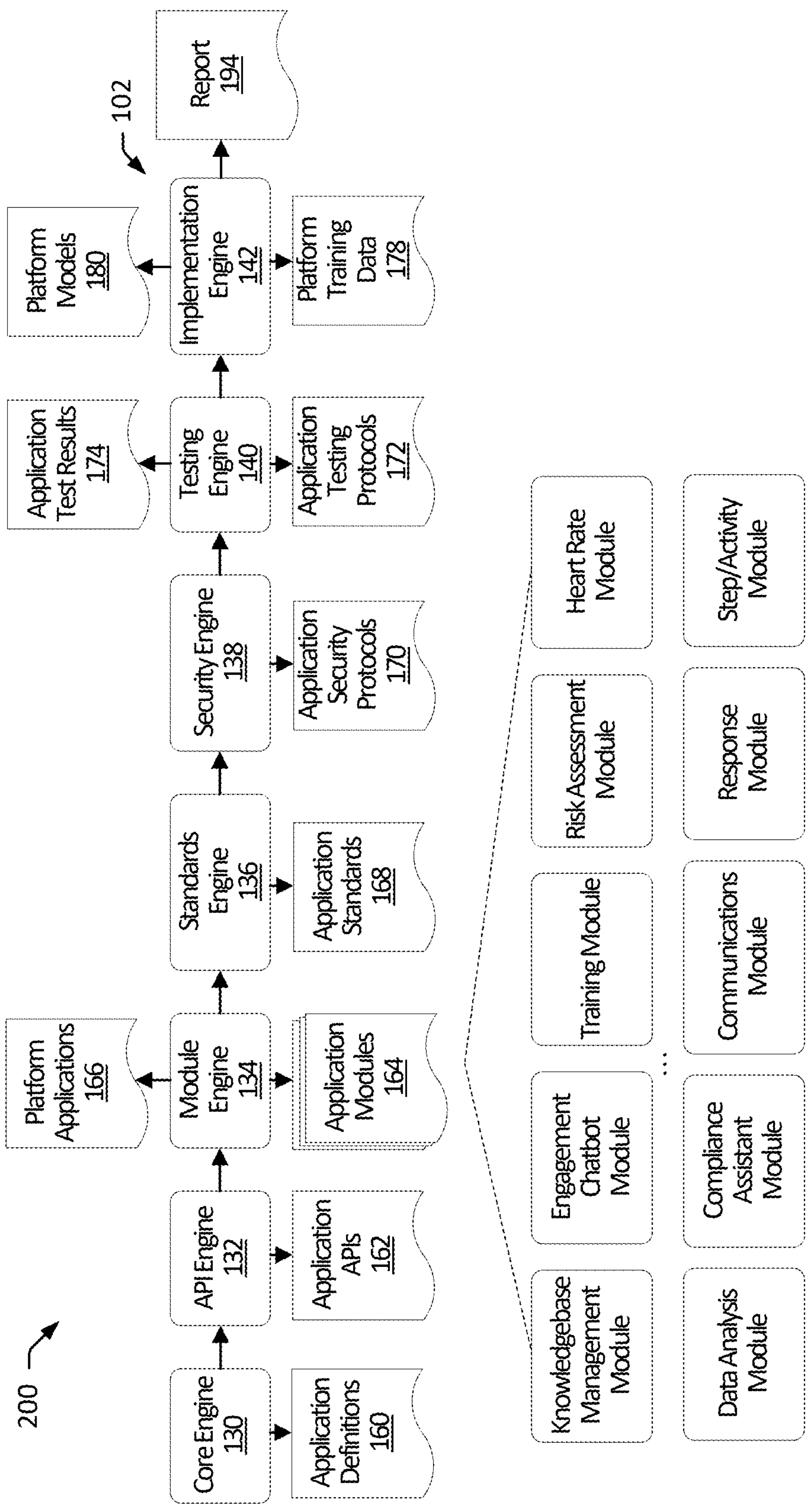
FIG. 2 is a flow diagram that illustrates an application development and implementation method in accordance with one or more embodiments.
Figure 3:
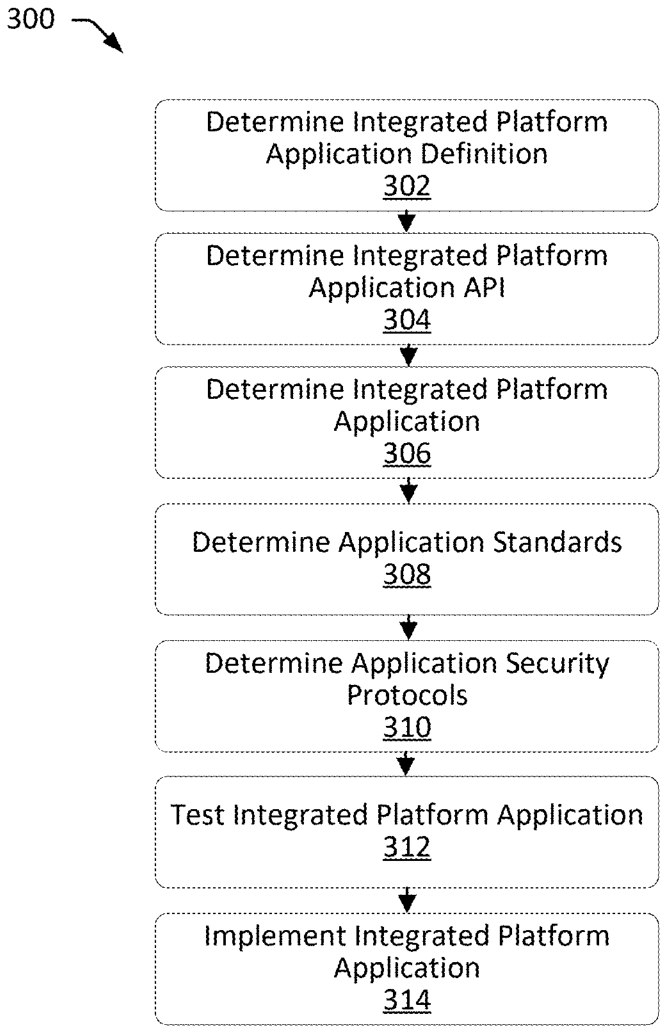
FIG. 3 is a flowchart that illustrates an application development and implementation method in accordance with one or more embodiments.

FIG. 2 is a flow diagram that illustrates an application development and implementation method 200 in accordance with one or more embodiments. FIG. 3 is a flowchart that illustrates an application development and implementation method 300 in accordance with one or more embodiments.

In some embodiments, method 300 includes determining an integrated platform application definition (block 302). This may include receiving or otherwise determining an integrated platform application definition for an integrated platform application to be deployed. For example, determining an integrated platform application definition may include the core engine 130 generating an application definition 160 for a healthcare-type platform application 166 to be generated, as described.

In some embodiments, method 300 includes determining an integrated platform application API (block 304). This may include receiving or otherwise determining an integrated platform application API for an integrated platform application to be deployed. For example, determining integrated platform application API may include the API engine 132 generating an application API 162 for the healthcare-type platform application 166 (e.g., based on the application definition 160), as described.

In some embodiments, method 300 includes determining an integrated platform application (block 306). This may include generating an integrated platform application to be deployed based on selected application modules. For example, determining an integrated platform application may include the module engine 132 selecting a set of application modules 164 (e.g., from a set of predetermined application modules 164) based on the application definition 160 and the application API 162 for the healthcare-type platform application 166, and generating the platform application 166 based on the selected set of application modules 164, as described. In the context of the healthcare-type example, the set of selected application modules 164 may include a first application module 164 to obtain user data 190 that includes heart rate type application results data by way of a first provider application 192*a* (e.g., heart rate type application modules 164 to source heart rate data from a heart monitoring provider application 192*a* operated by provider 104*a*), and a second application module 164 to obtain user data 190 that includes step/activity application results data by way of a second provider application 192*b* (e.g., a step/activity type application module 164 to source step/activity data from an activity monitoring provider application 192*b* operated by provider 104*b*). Such a healthcare-type platform application 166 may be operable to, for each of one or more users 112, such as users 112*a* and 112*b*, obtain user data 190, including the heart rate data and the activity data from the first and second provider application 192*a* and 192*b*, consolidate the application results data obtained to generate a consolidated health type report 194 for the user 112, and serve, to a user device 108 (e.g., one of the smartphone type user devices 108*a* and 108*b*), the consolidated health type report 194 for presentation to the user 112 (e.g., for display to the user 112*a* or 112*b* via a GUI of the smartphone type user device 108*a* or 108*b*). The consolidated health type report 194 may include, for example, heart rate data (e.g., measures of resting heart rate, active heart rate, heart rate variability, and the like), step/activity data (e.g., measures of step counts, distance covered, calories burned, and the like), along with other pertinent health data such as a composite health/activity score, suggested activities to improve the health of the user 112, or the like. In some embodiments, a platform application 166 is operable to take action on reports 194 and associated user data 190. For example, where heart rate data of a consolidated health type report 194 indicates a heart rate above a threshold level, the healthcare-type platform application 166 may be operable to identify a heart anomaly (e.g., a heart attack) and send an alert to a caregiver, medial staff, emergency services, or the like. Such a healthcare-type platform application 166 may enable seamless integration of multiple sources of data into one centralized location, eliminating a need for the user to access multiple sources of data/content. In the healthcare context, this can be crucial for enabling patients, especially those who find it challenging to log into and access multiple sources of their health data, to have access to personalized health data and reports that they can act on to improve their health. Similarly, in the military context, such consolidated and centralized reporting can be crucial for enabling soldiers, especially those that are in time sensitive scenarios to, to have access to complete data and reports that they can act on to execute their missions and goals effectively.

In some embodiments, method 300 includes determining application standards (block 308). This may include determining application standards for an integrated platform application to be deployed. For example, determining application standards may include the standards engine 136 determining application standards 168 for the healthcare-type platform application 166 (e.g., based on the healthcare-type platform application 166), as described.

In some embodiments, method 300 includes determining application security protocols (block 310). This may include determining application security protocols for an integrated platform application to be deployed. For example, determining application security protocols may include the security engine 138 determining application security protocols 170 for the healthcare-type platform application 166 (e.g., based on the healthcare-type platform application 166), as described.

In some embodiments, method 300 includes testing an integrated platform application (block 312). This may include conducting testing of an integrated platform application to be deployed. For example, testing an integrated platform application may include the testing engine 140 determining, or otherwise identifying, application testing protocols 172 for the healthcare-type platform application 166 (e.g., based on the healthcare-type platform application 166) and conducting testing of the healthcare-type platform application 166 (e.g., based on application testing protocols 172 for the healthcare-type platform application 166) to generate application test results 174, as described.

In some embodiments, method 300 includes implementing an integrated platform application (block 314). This may include deploying an integrated platform application. For example, implementing an integrated platform application may include implementation engine 142 deploying the healthcare-type platform application 166 in a given environment (e.g., downloading the healthcare-type platform application 166 to a cloud server or to a user device 108), where it is executed to perform the operations associated therewith, such as those described here. For example, the operations may include, for each of one or more users 112, such as users 112*a* and 112*b*, obtaining user data 190, including the heart rate data and the activity data from the first and second provider application 192*a* and 192*b*, consolidating the application results data obtained to generate a consolidated health type report 194 for the user 112, and serving, to a user device 108 (e.g., one of the smartphone type user devices 108*a* and 108*b*), the consolidated health type report 194 for presentation to the user 112 (e.g., for display to the user 112*a* or 112*b* via a GUI of the smartphone type user device 108*a* or 108*b*).

Where, for example, the healthcare-type platform application 166 and the first and second provider application 192*a* and 192*b* are both deployed and executed on a device, the healthcare-type platform application 166 may facilitate generating a consolidated report with minimal or no network communication of data. For example, in such an embodiment, a local instance of the healthcare-type platform application 166 executing on a smartphone type user device 108*a* may obtain user data 190 (e.g., a local copy of the user data 190), including the heart rate data and the activity data from local instances of the first and second provider applications 192*a* and 192*b* executing on the smartphone type user device 108*a*, and the local instance of the healthcare-type platform application 166 may, in turn generate and present the consolidated health type report 194 on the smartphone type user device 108*a*. Such an embodiment may reduce or eliminate the need for network communication of data. This may reduce network traffic overhead, increase speed and responsiveness of the system 101, and the healthcare-type platform application 166 (e.g., enabling real-time reporting of health conditions), or enable the healthcare-type platform application 166 to collect and assess user data 190 and generate reports 194 even when the smartphone type user device 108*a* is not connected to the network 114. In the health context, this can be crucial for providing patients with health reports 194 and associated alerts, even when their user device is not connected to the Internet or another network. Similarly, in the military context, such capability may provide soldiers with continued access to reports and associated alerts, even when their user device is not connected to the Internet or another network, such as when the soldier is on the battlefield or other remote location.

In some embodiments, implementing an integrated platform application includes determining training data based on execution of the integrated platform application and using the training data to train AI models. For example, user data 190 and reports 194 obtained and generated by the healthcare-type platform application 166 may be added to platform training data 178, and the resulting to platform training data 178 may be employed by machine learning algorithms to train AI models, such as platform models 180 that can predict potential health issues, or the like, based on patient health data. In such an embodiment, datasets obtained from different sources may be associated, and the platform training data 178 may reflect that association to improve training and performance of the AI models. For example, as described and continuing with the health report example, the platform generation and management system 102 may, by virtue of gaining the knowledge from the first and second provider applications 192*a* and 192*b* that the user data 190 contained in the heart rate report (or corresponding data) and the step/activity report (or corresponding data) are associated with the user 112*a*, generate a dataset that includes some or all of the heart rate report (or corresponding data), the step/activity report (or corresponding data), and the consolidated report 194 for the user 112*a*, noting their association with a single user. Such a dataset may enable data from separate data sources that may not otherwise reveal their association with a single user, to be associated with one another, such that it provides a more complete/improved dataset. In some embodiments, such a dataset may be employed to generate an improved training dataset that can be employed to better inform and train AI models. As described, data obtained, provided, or otherwise employed may be cleaned to ensure compliance with data regulations. For example, any patient data, such as the reports described, and any associated data derived therefrom, may be anonymized to transform the data so that an individual's identity is no longer directly or indirectly recognizable from the data. This may be crucial for protecting privacy, particularly in healthcare research, data sharing, and compliance with regulations such as HIPAA (Health Insurance Portability and Accountability Act) or GDPR (General Data Protection Regulation).

Figure 4:
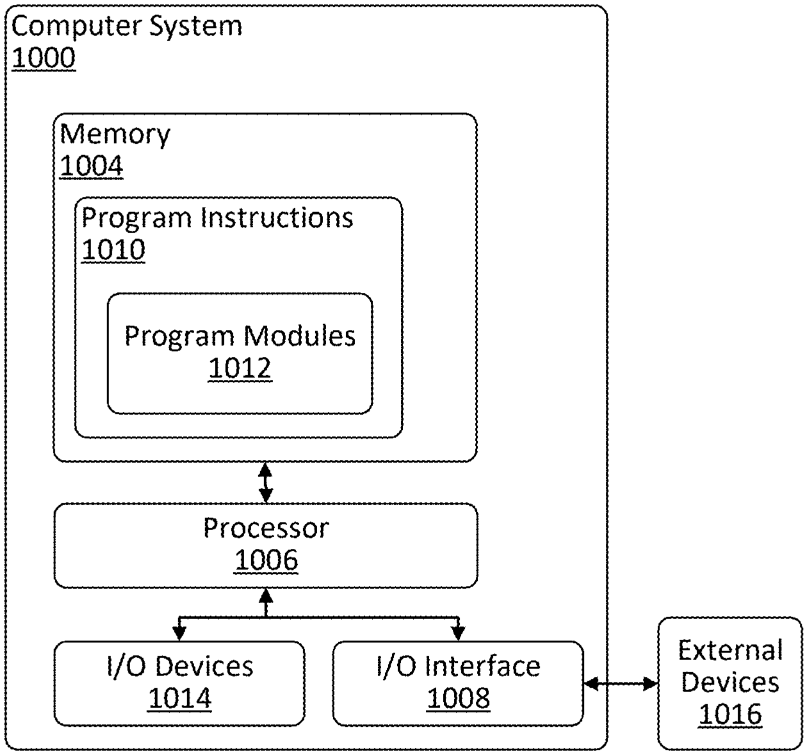
FIG. 4 is a diagram that illustrates an example computer system in accordance with one or more embodiments.

FIG. 4 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random-access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to one or more of the entities described (e.g., the application generation system 102, the platform application provider systems 104, and the platform user systems 106 (including the platform user devices 108, the platform DAQ devices 110, and the users 112), method 200, method 300, or one or more of the operations described.

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display/touch screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). As used throughout this application, the term "to" does not limit the associated operation to being directly to. Thus, for example, transmitting an item "to" an entity may include transmitting an item directly to the entity or indirectly to the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. An application system comprising:
- platform data acquisition devices associated with one or more users and configured to obtain user data;
- platform application provider systems, each configured to deploy a platform application that is configured to, for each user of one or more users:
  - obtain, by way of one or more platform data acquisition devices associated with the user, user data for the user;
  - generate, based on the user data obtained for the user, application results data for the user; and
  - provide, to a platform user device associated with the user for presentation to the user, the application results data for the user;
- platform user devices, each associated with a user and configured to present application results data; and
- a platform generation and management system configured to:
  - determine an integrated platform application definition for an integrated platform application;
  - determine, based on the integrated platform application definition, an integrated platform application programming interface (API) for the integrated platform application;
  - select, based on the integrated platform definition, a set of platform application modules to be integrated into the integrated platform application, each platform application module of the set of platform application modules being selected from a predetermined set of platform application modules and corresponding to a platform application deployed by platform application provider;
  - generate, based on the application modules selected and the platform API, the integrated platform application, the integrated platform application configured to:
    - obtain, for each of two or more platform applications corresponding to a platform application of the set of platform application modules selected, application results data for the user generated by the platform application;
    - consolidate the application results data obtained to generate a consolidated results report for the user; and
    - present, via a platform user device associated with the user, the consolidated results report for the user;
  - determine, based on the integrated platform application, application standards;
  - determine, based on the integrated platform application, application security protocols;
  - test, based on the application standards and the application security protocols, the integrated platform application to determine integrated platform application test results;
  - determine whether the integrated platform application test results satisfy threshold testing criteria; and
  - deploy, in response to determining that the integrated platform application test results satisfy threshold testing criteria, the integrated platform application.

2. The system of claim 1, wherein the integrated platform definition is provided by a user and defines two or more platform applications to be integrated into the integrated platform application.

3. The system of claim 1, wherein the integrated platform application API is generated based on application of the integrated platform definition to a platform application API generation model.

4. The system of claim 1, wherein each platform application module is generated based on application of the corresponding platform application to a platform application module generation model.

5. The system of claim 1, wherein the application standards are generated based on application of the corresponding platform application to a platform application standards generation model.

6. The system of claim 1, wherein the application security protocols are generated based on application of the corresponding platform application to a platform application security generation model.

7. The system of claim 1, wherein testing of the integrated platform application comprises subjecting the integrated platform application to one or more of the following security assessments: threat modeling, static application security testing (SAST), dynamic application security testing (DAST), penetration testing, vulnerability scanning, secure configuration testing, application programming interface (API) security testing, security logging and monitoring validation, access control testing, encryption testing, patch management and dependency scanning, compliance audits, user education and social engineering testing, and automated continuous security testing.

8. The system of claim 7, wherein the application test results comprise a security assessment score corresponding to the one or more security assessments that the integrated platform is subjected to, and wherein determining that the integrated platform application test results satisfy threshold testing criteria comprises determining that the security assessment score satisfies a security assessment score threshold.

9. The system of claim 1, wherein deploying the integrated platform application comprises the integrated platform application executing to perform the following:
- obtaining, by way of each of the two or more platform applications, application results data for a given user that is generated by the two or more platform applications;
- consolidating the application results data for the given user obtained to generate a consolidated results report for the given user; and presenting, via a platform user device associated with the given user, the consolidated results report for the given user.

10. The system of claim 1, wherein the results data for the user generated by the two or more platform applications is obtained via a platform user device associated with the user, and wherein the application results data for the user obtained to generate a results report for the user is consolidated locally on the platform user device, the consolidation including:

obtaining, by a local instance of the integrated platform application executing on the platform user device and from local instances of the two or more platform applications executing on the platform user device, a local copy of the results data generated by the two or more platform applications; and consolidating, by the local instance of the integrated platform application executing on the platform user device, the local copy of the results data generated by the two or more platform applications, to generate the consolidated results report for the user.

11. The system of claim 1, wherein the platform generation and management system is configured to:

associate the application results data with a single user;

anonymize the application results data to generate a set of anonymized data associated with a single user; and generate an application model training dataset based on the set of anonymized data associated with a single user; and train, based on the application model training dataset, an application model.

12. A method comprising:

determining an integrated platform application definition for an integrated platform application;

determining, based on the integrated platform application definition, an integrated platform application programming interface (API) for the integrated platform application;

selecting, based on the integrated platform definition, a set of platform application modules to be integrated into the integrated platform application, each platform application module of the set of platform application modules being selected from a predetermined set of platform application modules and corresponding to a platform application deployed by platform application provider;

generating, based on the application modules selected and the platform API, the integrated platform application, the integrated platform application configured to:

obtain, for each of two or more platform applications corresponding to a platform application of the set of platform application modules selected, application results data for a user generated by the platform application;

consolidate the application results data obtained to generate a consolidated results report for the user; and present, via a platform user device associated with the user, the consolidated results report for the user;

determining, based on the integrated platform application, application standards;

determining, based on the integrated platform application, application security protocols;

testing, based on the application standards and the application security protocols, the integrated platform application to determine integrated platform application test results;

determining whether the integrated platform application test results satisfy threshold testing criteria; and deploying, in response to determining that the integrated platform application test results satisfy threshold testing criteria, the integrated platform application.

13. The method of claim 12, wherein the integrated platform definition is provided by a user and defines two or more platform applications to be integrated into the integrated platform application.

14. The method of claim 12, wherein the integrated platform application API is generated based on application of the integrated platform definition to a platform application API generation model, wherein each platform application module is generated based on application of the corresponding platform application to a platform application module generation model, wherein the application standards are generated based on application of the corresponding platform application to a platform application standards generation model, or wherein the application security protocols are generated based on application of the corresponding platform application to a platform application security generation model.

15. The method of claim 12, wherein testing of the integrated platform application comprises subjecting the integrated platform application to one or more of the following security assessments: threat modeling, static application security testing (SAST), dynamic application security testing (DAST), penetration testing, vulnerability scanning, secure configuration testing, application programming interface (API) security testing, security logging and monitoring validation, access control testing, encryption testing, patch management and dependency scanning, compliance audits, user education and social engineering testing, and automated continuous security testing.

16. The method of claim 15, wherein the application test results comprise a security assessment score corresponding to the one or more security assessments that the integrated platform is subjected to, and wherein determining that the integrated platform application test results satisfy threshold testing criteria comprises determining that the security assessment score satisfies a security assessment score threshold.

17. The method of claim 12, wherein deploying the integrated platform application comprises the integrated platform application executing to perform the following:

obtaining, by way of each of the two or more platform applications, application results data for a given user that is generated by the two or more platform applications;

consolidating the application results data for the given user obtained to generate a consolidated results report for the given user; and presenting, via a platform user device associated with the given user, the consolidated results report for the given user.

18. The method of claim 12, wherein the results data for the user generated by the two or more platform applications is obtained via a platform user device associated with the user, and wherein the application results data for the user obtained to generate a results report for the user is consolidated locally on the platform user device, the consolidation including:

obtaining, by a local instance of the integrated platform application executing on the platform user device and from local instances of the two or more platform applications executing on the platform user device, a local copy of the results data generated by the two or more platform applications; and consolidating, by the local instance of the integrated platform application executing on the platform user device, the local copy of the results data generated by the two or more platform applications, to generate the consolidated results report for the user.

19. The method of claim 12, the method further comprising:

associating the application results data with a single user;

anonymizing the application results data to generate a set of anonymized data associated with a single user;

generating an application model training dataset based on the set of anonymized data associated with a single user; and training, based on the application model training dataset, an application model.

20. A non-transitory computer readable medium comprising program instructions stored thereon that are executable by a processor to perform the following operations:

determining an integrated platform application definition for an integrated platform application;

determining, based on the integrated platform application definition, an integrated platform application programming interface (API) for the integrated platform application;

selecting, based on the integrated platform definition, a set of platform application modules to be integrated into the integrated platform application, each platform application module of the set of platform application modules being selected from a predetermined set of platform application modules and corresponding to a platform application deployed by platform application provider;

generating, based on the application modules selected and the platform API, the integrated platform application, the integrated platform application configured to:

obtain, for each of two or more platform applications corresponding to a platform application of the set of platform application modules selected, application results data for a user generated by the platform application;

consolidate the application results data obtained to generate a consolidated results report for the user; and present, via a platform user device associated with the user, the consolidated results report for the user;

determining, based on the integrated platform application, application standards;

determining, based on the integrated platform application, application security protocols;

testing, based on the application standards and the application security protocols, the integrated platform application to determine integrated platform application test results;

determining whether the integrated platform application test results satisfy threshold testing criteria; and deploying, in response to determining that the integrated platform application test results satisfy threshold testing criteria, the integrated platform application.

* * * * *